No. 649,950. Patented May 22, 1900.
J. K. PUMPELLY.
BATTERY PLATE.
(Application filed July 19, 1898. Renewed Oct. 27, 1899.)
(No Model.)
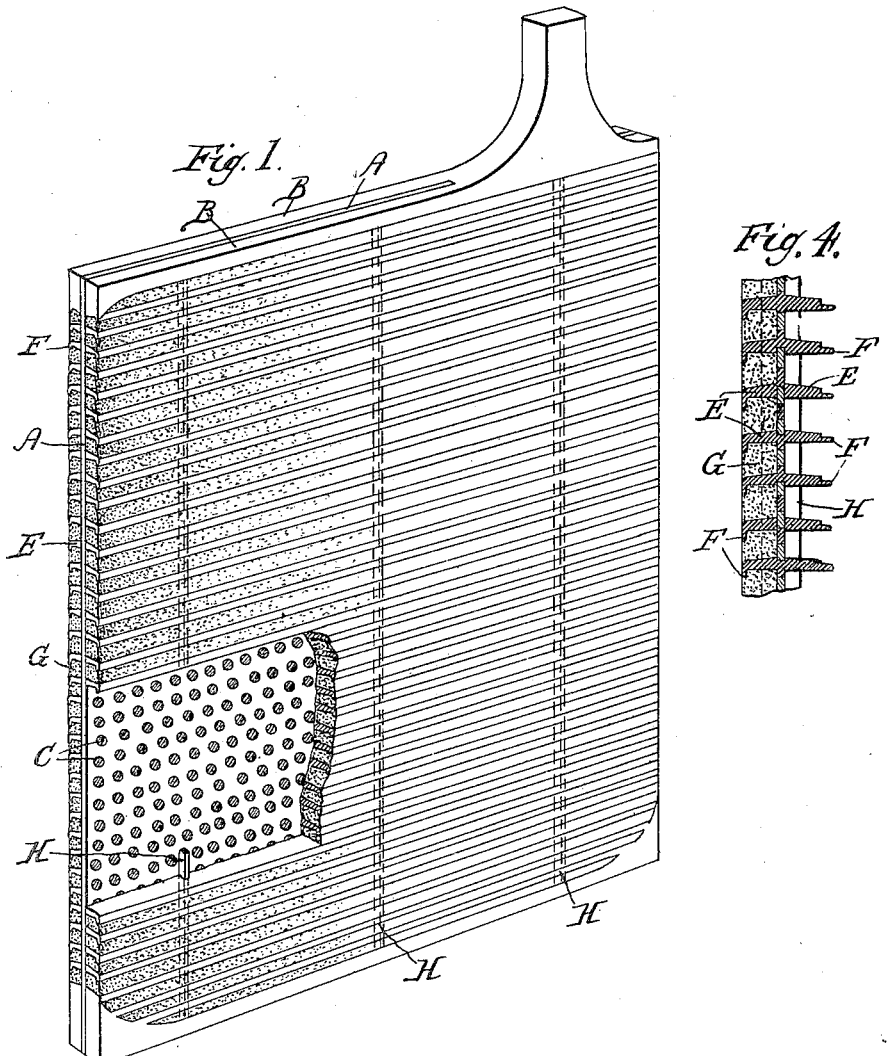
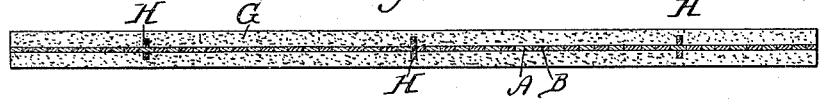

UNITED STATES PATENT OFFICE.

JAMES KENT PUMPELLY, OF CHICAGO, ILLINOIS, ASSIGNOR TO SAMUEL W. EHRICH, OF NEW YORK, N. Y.

BATTERY-PLATE.

SPECIFICATION forming part of Letters Patent No. 649,950, dated May 22, 1900.

Application filed July 19, 1898. Renewed October 27, 1899. Serial No. 734,984. (No model.)

*To all whom it may concern:*

Be it known that I, JAMES KENT PUMPELLY, a citizen of the United States, residing at Chicago, in the county of Cook and State of Illinois, have invented certain new and useful Improvements in Battery-Plates, of which the following is a full, clear, and exact specification, reference being had to the accompanying drawings, forming part thereof.

This invention relates to improvements in the construction of battery-plates or electrodes primarily intended for use in storage batteries, but relates more particularly to that class of battery-plates in which lead constitutes the support for or forms a part of the active material. As heretofore constructed great difficulty has been encountered in securing the desirable degree of lightness combined with durability and efficiency in this class of electrodes and for motor-vehicle purposes or wherever the battery is used while in transit lightness is of prime importance. Furthermore, the electrodes as heretofore constructed, whether light or heavy, disintegrate under the electrolytic action at an early period in their use, become spongy or peroxidized, and not only lose their conductivity, but crumble and shed pieces, which accumulate and bridge between the plates, causing short-circuiting of the electrodes and early destruction of the battery. It is now well understood in this art that where the battery-plate and the supports for the active material applied thereto are integral and formed of cast metal the above objections are greatly magnified, while the weight of the battery necessarily becomes excessive and so great as to be practically uncommercial, while, on the other hand, if formed of rolled sheet-lead no proper support is afforded for the active material which must necessarily be applied thereto, and to prevent buckling or short-circuiting from the falling off of the active material the plates must be made practically as heavy as the cast-metal plates.

The primary object of my invention is to avoid these difficulties by providing a plate which shall combine the desirable quality of lightness with strength and durability, which will not buckle, and to which the active material, whether formed out of the plate itself or added thereto, will adhere to the plate until the same has become worn beyond usefulness, thereby avoiding the liability of short-circuiting the battery, and thus detracting from, if not destroying, the efficiency of the battery.

Another object is to have the battery-plate of such construction that the members thereof may be proportioned to any work for which they are desired, thus enabling lightness to be secured where that characteristic is especially desirable without sacrifice of the necessary durability or rigidity of the plates or enabling the securing of great power in the battery with the necessary strength and rigidity, where such quality is desirable, without sacrifice of lightness.

These and such other objects as may hereinafter appear are attained by the devices illustrated in the accompanying drawings, in which—

Figure 1 is a perspective view of the preferred form of my improved electrode, partly broken away to show the interior construction thereof. Fig. 2 is a cross-section through the same. Fig. 3 is an enlarged detail section thereof, and Fig. 4 is an enlarged detail vertical section through the same.

Similar letters of reference indicate the same parts in the several figures of the drawings.

Referring now to the drawings, A indicates a sheet of rolled lead of suitable dimensions, and B indicates two exterior layers or sets of ribs of cast-lead between which the sheet of rolled lead is located, the cast-lead layers or sets of ribs being preferably cast upon and adhering to the sheet-lead core, although they may be otherwise secured thereto, and are so disposed thereon as to expose the core at intervals or between each pair of ribs where that is the form given to the cast metal.

As shown at C, the sheet of rolled lead A is preferably perforated, and in such case the molten cast-lead when poured into the mold in which the electrode is formed would pass through the perforations in said sheet-lead, and the external ribs or layers B of cast-lead would thus be integrally connected together and firmly secured upon the rolled-lead core without other means of attachment. The construction which I prefer, however, is to mold the cast metal in parallel ribs E, which are held firmly in place by the cast-lead flowing through the perforations in the rolled-lead plate or core, from which the ribs project at opposite sides. These ribs when the plate is first formed are provided with thin longitudinal lips F, (illustrated at the right-hand side of Fig. 4,) which lips after the active material G is filled in between the ribs are bent down, so as to lock the active material in place between the ribs and hold the same against dislodgment during the working of the battery. These thin ribs can be easily bent down to perform this service by a tool run over the edges thereof with the proper force, a straight bar of greater length than the ribs being a handy tool for this purpose. I have found in the practical use of battery-plates of this kind that it is desirable that the ribs should extend from edge to edge of the plates without any strengthening-ribs or thickening of the plates along the edge, for such strengthening-ribs or thickening of the edge of the plate is apt to produce buckling, whereas when absent the plate may expand longitudinally and laterally with the swelling of the active material and the conversion of the cast-metal ribs into spongy lead without causing any deflection, bending, or buckling of the plate. The desirable degree of rigidity or stiffness of the plate may be secured by providing the strengthening-webs H at intervals of the plate extending transversely to the ribs E, which webs while expanding with the plate at the same time serve to prevent the buckling or flexure thereof. I have also found in practice that by having the battery-plate or electrode composed of sheet-lead and cast-lead, as hereinbefore described, I can readily adjust the relative thickness and weight of the rolled and cast lead, so as to secure desirable lightness without sacrifice of rigidity and durability or so as to secure a very powerful electrode without excessive weight. The molecular compactness of the sheet-lead causes it to be but slightly affected by the action of electrolysis, and it yields very slowly to the same, and, in fact, is not attacked at all by such action except on the edges thereof until the battery-plate is practically used up. On the other hand, the softer cast-lead yields with comparative promptness to the electrolytic action and may itself be converted into active spongy lead or may serve as a support for the usual active material while working in conjunction therewith. Hence it will be seen that the cast metal supporting the active material may be eaten away until honeycombed and spongy, and yet adhere to and be retained as and form a part of the electrode with but slight possibility of either the cast-lead or the active material falling from the intermediate sheet-lead, thereby obviating the early disintegration and destruction of the electrode, the resultant danger of lessened conductivity, or the short-circuiting of the battery.

I am aware that it has been proposed—for instance, in Letters Patent No. 388,746 to J. T. Van Gestel—to construct a battery-plate having a core of copper or some other metal having low electrical resistance provided with a covering of lead or lead alloy integral throughout and united at openings through the core; but this is not the same as my invention, and I desire to specifically disclaim the same. I am not aware, however, that a battery-plate has heretofore been composed of a core of rolled sheet metal or other metal of high electrical resistance having supports for the active material of cast-lead cast thereon, and it is in this particular that my invention differs in construction, operation, and result from the invention disclosed in the Van Gestel patent or any other prior invention known to me.

Practice has demonstrated that where the base-plate or core is of low electrical resistance it is absolutely necessary to cover and protect the same against the attack of the electrolytic fluid, to which it rapidly succumbs, and hence in all battery-plates so far as known to me where the base-plate or core is a metal of low electrical resistance there must be provided a covering of some kind, and this covering must be integral throughout in order to protect the core against the action of electrolysis, which would soon destroy the plate. On the other hand, I have discovered that by employing a core of rolled sheet-lead or other metal of high electrical resistance a covering integral throughout or any other means of protecting the core from the action of the electrolytic fluid is rendered wholly unnecessary, the exposure of the core may be whatever is desired in the distribution of the supports for the active material upon the plate, the proportions of weight between the core and the supports for the active material may be varied to suit practically any contingency or condition, the battery may be more cheaply constructed and economically used, because little care or skill is necessary in the manufacture thereof beyond that of assuring a firm attachment of the supports to the plate, and the destruction of the plate as a whole is not only retarded in the maximum degree, but the possibility of short-circuiting of a battery made up of such plates is practically eliminated.

Having described my invention, what I claim, and desire to secure by Letters Patent, is—

1. An electrode for electric batteries, consisting of a core of rolled sheet-lead and supports for the active material composed of cast-lead on each side of the same, said supports being so disposed as to expose the core at intervals, substantially as described.

2. An electrode for electric batteries, consisting of a core of rolled sheet-lead having supports for the active material composed of lead cast thereon, said supports being so disposed as to expose the core at intervals, substantially as described.

3. An electrode for electric batteries, consisting of a core of perforated rolled sheet-lead and supports for the active material composed of lead cast on each side of, and supported by, the same, said supports being so disposed as to expose the core at intervals, substantially as described.

4. An electrode for electric batteries, consisting of a core of perforated rolled sheet-lead and ribs of lead cast on each side of said core, so as to leave the same exposed between said ribs, substantially as described.

5. An electrode for electric batteries, consisting of a core of perforated rolled sheet-lead, and ribs of lead cast on each side of said core so as to leave the same exposed between the ribs, said ribs being connected by webs extending transversely therebetween, substantially as described.

JAMES KENT PUMPELLY.

Witnesses:
W. R. OMOHUNDRO,
CORA WOOD.